United States Patent [19]

Greer

[11] Patent Number: 4,941,524

[45] Date of Patent: Jul. 17, 1990

[54] AWNING HINGE

[75] Inventor: Bradley G. Greer, Irvine, Calif.

[73] Assignee: A & E Systems, Inc., Santa Ana, Calif.

[21] Appl. No.: 226,186

[22] Filed: Jul. 28, 1988

[51] Int. Cl.⁵ ............................................. E04F 10/06
[52] U.S. Cl. ..................................... 160/67; 296/163; 49/383
[58] Field of Search ..................... 160/67, 47, 61, 41; 296/163; 16/224, 355; 49/383, 397; 135/89

[56] References Cited

U.S. PATENT DOCUMENTS

| | | | |
|---|---|---|---|
| 2,504,635 | 4/1950 | Bradley | 49/383 X |
| 3,075,234 | 1/1963 | Speakman | 49/383 X |
| 3,634,172 | 1/1987 | Duda | 296/163 |
| 4,726,153 | 2/1988 | Adler et al. | 135/89 X |

Primary Examiner—Blair M. Johnson
Attorney, Agent, or Firm—Pearne, Gordon, McCoy & Granger

[57] ABSTRACT

A recreational vehicle has a retaining member extending along the side of a vehicle to retain a cover for an awning. The cover may be formed from a plurality of metallic slats pivotable relative to one another to define a housing for the awning fabric in one pivotable relationship of the slats and to define an extension of the awning fabric in a second pivotable relationship of the slats. The slat closest to the recreational vehicle in the second pivotable relationship of the cover may also have a retaining portion. A first member is provided with detaining portions at its opposite ends to be detained by the retaining member on the recreational vehicle and the retaining portion on the slat closest to the recreational vehicle. The first member may have a coupling portion at an intermediate position between its opposite ends. This coupling portion co-operates with a sealing member to hold the sealing member on the first member. The sealing member may be made from a resilient material such as a vinyl. The sealing member may be provided with a first portion, such as a first flap, which extends over the retaining portion on the slat to seal the retaining portion against water leakage. The sealing member may also be provided with a second portion, such as a second flap, which extends over the retaining member on the recreational vehicle to seal the retaining member against water leakage.

7 Claims, 1 Drawing Sheet

AWNING HINGE

This invention relates to awnings for recreational vehicles. More particularly, this invention relates to apparatus for coupling an awning to a recreational vehicle to connect, hinge and seal the awning to the recreational vehicle. The apparatus of this invention is particularly adapted to be used with a metallic cover having hinged slats pivotable relative to one another to house an awning fabric in a closed disposition of the awning and to constitute an extension of the awning fabric in an open disposition of the awning.

Awnings are provided for recreational vehicles to provide shade for the occupants and their friends when the recreational vehicles are parked at a campsite. The awnings are attached to the side of the vehicle. While the vehicle is travelling, the awning fabric is rolled tightly on a roller and is retained firmly against the side of the vehicle. When the vehicle is parked at a campsite, the awning fabric may be unrolled from the roller to an open position to offer the occupants shade and comfort.

In one type of awning, the awning fabric is attached to a metallic cover formed from a plurality of slats. The slats are hinged so as to be pivotable relative to one another. In one pivotable disposition of the slats, the cover defines a portion of a cylinder forming a housing. In this disposition, the awning fabric is wound on the roller and is within the cylindrical housing so as to be protected by the housing. In another pivotable disposition of the slats, the slats are disposed in a substantially linear relationship so as to form an extension of the awning fabric. In this disposition, the awning is in an open, or at least a partially open, disposition.

In order to attach the cover to the recreational vehicle, a retaining member is attached to the side of the recreational vehicle and a retaining portion is disposed on the slat at the end closest to the recreational vehicle. The retaining members are provided with C-shaped configurations. A mechanism has been coupled to the retaining members on the slat and the recreational vehicle to connect the cover to the recreational vehicle and to provide a hinge and seal between the cover and the recreational vehicle.

The mechanism described in the previous paragraph has not been completely effective in sealing the cover against water leakage. For example, U.S. Pat. No. 4,634,172 indicates that this problem existed for a number of years prior to Nov. 29, 1985, the date that the patent appication issued into U.S. Pat. No. 4,634,172 was filed in the United States Patent Office. However, the mechanism dislosed and claimed in U.S. Pat. No. 4,634,172 still exhibits water leakage on occasion.

In one embodiment of the invention, a first member is provided with detaining portions at its opposite ends to be detained by the retaining member on the recreational vehicle and the retaining portion on the slat closest to the recreational vehicle. The first member may have a coupling portion at an intermediate position between its opposite ends. This coupling portion co-operates with a sealing member on the first member. The sealing member may be made from a resilient material such as a vinyl. The sealing member may be provided with a portion, such as a first flap, which extends over the retaining portion on the slat to seal the retaining portion against water leakage. The second member may also be provided with a second portion, such as a second flap, which extends over the retaining member on the recreational vehicle to seal the retaining member against water leakage.

In the drawings:

FIG. 1 is a schematic perspective view of a recreational vehicle and an awning attached to the side of the recreational vehicle, the awning being shown in the open position;

Figures 2, 3, 4:
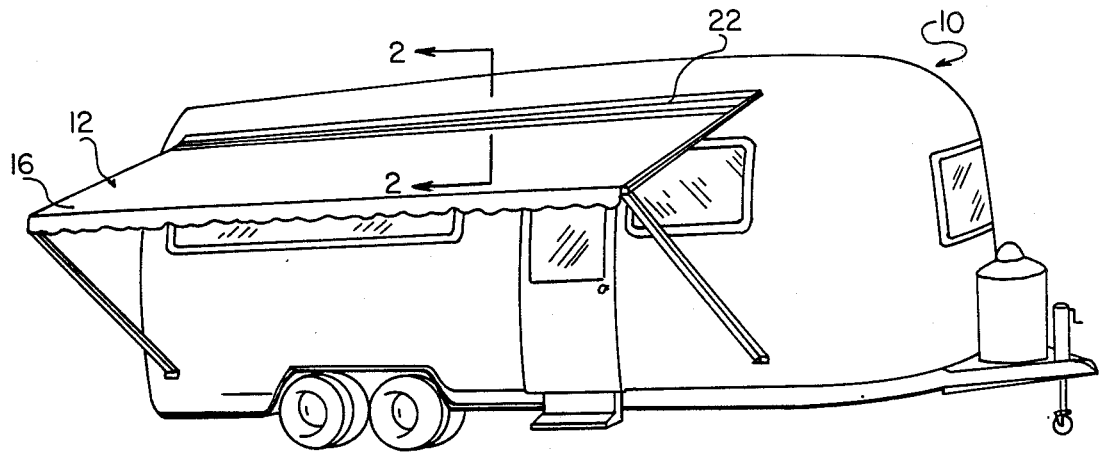
FIG. 2 is an enlarged schematic sectional view taken substantially on the line 2—2 of FIG. 1 and shows a retaining member on the side of the recreational vehicle, the awning in a slightly opened position and apparatus constituting this invention for coupling the awning to the recreational vehicle.

FIG. 3 is an enlarged fragmentary sectional view of the members included within the looped arrow designated as "3" in FIG. 2 and particularly shows the construction of the apparatus constituting this invention and the coupling of this apparatus to the awning and the recreational vehicle; and FIG. 4 is an enlarged fragmentary sectional view, similar to that shown in FIG. 3 and shows a modification of one of the members in the apparatus shown in FIG. 3.

A recreational vehicle generally indicated at 10 is shown in FIG. 1. The recreational vehicle 10 may be of the type, such as shown in FIG. 1, which is adapted to be attached at its front end to the rear end of a motor cab. Alternatively, the recreational vehicle 10 may be self contained. The recreational vehicle may vary considerably in length. This causes the lateral disposition of an awning, generally indicated at 12, along the side of the recreational vehicle to vary consideraby in length. As a result, the lateral disposition of the awning along the side of the vehicle may vary between only a few feet to a dimension considerably in excess of twenty feet (20').

The awning 12 may include a cylindrical roller 14 made from a suitable material such as steel or aluminum. Awning fabric 16 made from a suitable material such as an acrylic, a polyester or a polyvinyl chloride is attached as at 18 to the roller 14. In one disposition as shown in FIG. 2, the awning fabric 16 is wound on the roller 14. In another disposition as shown in FIG. 1, the awning fabric 16 is unwound from the roller 14 to protect occupants of the recreational vehicle 10 and their friends from the sun.

A cover generally indicated at 20 is suitably attached to the awning fabric 16 at the end of the awning fabric opposite to the attachments 18 of the awning fabric to the roller 14. The cover 20 may be made from a plurality of slats 22 which are hinged to one another as at 24 so as to be pivotable relative to one another. In one pivotable disposition, the slats 24 enclose the awning fabric 16 so as to protect the awning fabric against the elements when the awning fabric is wound on the roller 14. This may be seen from FIG. 2, which shows the slats 24 partially enclosing the awning fabric 16. In another disposition as shown in FIG. 1, the slats 22 effectively constitute an extension of the awning fabric 16 when the awning is in the open, or partially open, configuration.

The slat 22 closest to the recreational vehicle 10 is provided with a retaining portion 26 which is preferably provided with a C-shaped configuration. A retaining member 28 preferably having a C-shaped configuration is suitably attached to the side of the recreational vehicle. A first member generally indicated at 30 is provided with detaining portions 32 and 34 at their ends for coupling to the retaining portion 26 and the retaining member 28. When the retaining portion 26 and the retaining member 28 have C-shaped configurations, the detaining portions 32 and 34 may constitute beads. The first member 30 may be made from a suitable material such as aluminum but it may also be made from other metals such as steel or from any suitable hard material.

At an intermediate position between the detaining portions 32 and 34, the first member 30 may be provided with a coupling portion 36. Preferably the coupling portion 36 has a C-shaped configuration with the open end of the C-shaped configuration facing upwardly. A bead 38 on a sealing member 40 is disposed in the coupling portion 36 in a mating relationship with the coupling portion. The sealing member 40 is preferably made from a resilient material such as rubber or a vinyl.

The sealing member 40 is provided with a portion 42 which extends from an intermediate position on the member to a position for sealing the retaining portion 26 and the detaining portion 32 against water leakage. Preferably the portion 42 constitutes a flap which extends to the slat 22a and engages the slat 22a at a position further removed from the recreational vehicle 10 than the retaining portion 26 and the detaining portion 32.

The sealing member 40 may also have a portion 44 which extends from an intermediate position on the member to a position for sealing the retaining member 28 and the detaining portion 34 against water leakage. Preferably the portion 44 constitutes a flap which extends to the retaining members 28 and the detaining portion 34 and engages the retaining member 28 at a position covering the retaining member 28 and the detaining portion 34.

The member 30 couples the awning cover 20 to the recreational vehicle 10 and also acts as a hinge between the awning cover and the recreational vehicle. The action of the member 30 as a hinge is important because the awning fabric 16 and the cover 20 have a different disposition relative to the recreational vehicle with the awning in the closed position than with the awning in the open position.

The member 40 acts as a seal to prevent water from leaking through the retaining portion 26 the detaining portion 32 and through the retaining member 28 and the detaining portion 34. Without the member 40, there would be a distinct tendency for water to leak through the retaining portion 26 and the retaining member 28, particularly when the member 30 is made from a metal such as aluminum which has no resiliency.

With the disposition of the sealing member 40 on the member 30 in coupled relationship to the member 30, the flaps 42 and 44 act to define a path for the flow of water which impinges on the flaps. As will be seen, the water flows along the flap 42 to the slat 22a. When the water reaches the slat 22a, the water is beyond the retaining portion 26 and the detaining portion 32. Because of this, the water is not able to leak through the retaining portion 26 and the detaining portion 32. Similarly, water flows downwardly along the flap 44 to a position beyond the retaining member 28 and the detaining portion 34. This prevents water from leaking through the retaining member 28 and the detaining portion 34.

FIG. 4 shows a modification of the member 30 in FIG. 3. As shown in FIG. 4, portions of a member 50 extend upwardly from a coupling portion 52. Detaining portions 54 and 56 respectively corresponding to the detaining portions 32 and 34 in FIG. 3 are disposed at the ends of the member 50.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for attachment to a recreational vehicle having a retaining member,
    awning fabric,
    a metallic cover for the fabric, the metallic cover being formed from a plurality of slats hinged relative to one another pivotable into a first relationship for housing the awning fabric and pivotable into a second relationship to provide an unwinding of the fabric, the slat at one end of the cover being attached to the awning fabric, the slat at the other end of the cover being provided with a retainer member,
    a first member having first and second detaining portions at opposite ends of the first member, the detaining portion at-the first end of the first member being detained by the retaining member on the slat at the other end of the cover and the detaining portion at the second-. end of the first member being detained by the retaining member on the recreational vehicle, and
    a second member coupled to the first member and having a flap disposed relative to the slat at the other end of the cover to seal the slat against water leakage with the cover in the open relationship.

2. In a combination as set forth in claim 1,
    wherein said flap extends over the retaining member on the recreational vehicle to seal such retaining member against water leakage.

3. In a combination as set forth in claim 2,
    wherein said flap is made from a resilient material.

4. The combination as claimed in claim 3 further comprising an additional flap on said sealing element extending toward said recreational vehicle and over said detaining portion at the other end of said coupling member.

5. The combination as claimed in claim 4 wherein the retaining part of said coupling member for said sealing element is positioned intermediate between said first and second detaining portions.

6. The combination as claimed in claim 4 wherein said flaps are of a resilient material.

7. In combination for a recreational vehicle, an awning fabric, a rigid cover for the fabric formed from a plurality of slats hinged relative to one another and being pivotable into a first relationship for housing said awning fabric and pivotable into a second relationship for unwinding said awning fabric to an open position, the slat at the end of the cover adjacent to said recreational vehicle being provided with a first retainer member,
    a second retainer member on said recreational vehicle,
    a coupling member having first and second detaining portions at opposite ends thereof, the detaining portion at one end being held by the retainer member on said slat and the detaining portion at the other end of said coupling member being held by said second retainer member, and
    a sealing element retained by said coupling member having at least one flap extending over the slot at the other end of said cover to seal the cover against water leakage in said open position.

* * * * *